United States Patent [19]

Pressaco

[11] 4,237,923
[45] Dec. 9, 1980

[54] SOLENOID NON RETURN VALVE

[75] Inventor: Pierre Pressaco, Clichy, France

[73] Assignee: Societe Anonyme D.B.A., Paris, France

[21] Appl. No.: 936,154

[22] Filed: Aug. 23, 1978

[30] Foreign Application Priority Data

Sep. 9, 1977 [FR] France .................. 77 27267

[51] Int. Cl.³ ............................................. F16K 31/02
[52] U.S. Cl. .................................... 137/495; 137/508; 137/870; 137/881
[58] Field of Search ............... 137/495, 508, 803, 870, 137/881, 871; 251/139

[56] References Cited

U.S. PATENT DOCUMENTS

| | | | |
|---|---|---|---|
| 1,707,541 | 4/1929 | Roth | 251/139 |
| 2,830,743 | 4/1958 | Rimsha et al. | 251/139 |
| 2,989,977 | 6/1961 | Matter | 137/508 |
| 3,115,891 | 12/1963 | Kimm | 137/495 |
| 3,537,475 | 11/1970 | Pottinger | 137/881 |
| 3,545,472 | 12/1970 | Franz | 137/495 |
| 3,568,710 | 3/1971 | Boyer et al. | 137/508 |
| 3,731,881 | 5/1973 | Dixon et al. | 251/139 |
| 3,782,410 | 1/1974 | Stenby | 137/508 |

Primary Examiner—Martin P. Schwadron
Assistant Examiner—G. L. Walton
Attorney, Agent, or Firm—Paul David Schoenle; Ken C. Decker

[57] ABSTRACT

A solenoid valve comprising a housing having opposed inlet and outlet ports which communicate via a passage containing a poppet member movable in response to energization of a coil is disclosed. A flexible wall is further provided in said passage to define inlet and outlet chambers communicating respectively with said inlet and outlet ports. A second passage in said flexible wall connects said chambers, and a resilient spring urges a valve seat defined in said second passage into fluid tight engagement with the poppet member, whatever the position of the latter. The poppet member is movable between a first position in which it urges the wall against an abutment, thereby preventing any communication between the inlet and outlet ports, and a second position in which the wall is movable relative thereto, whereby said wall acts as a non-return valve between the inlet and outlet ports.

18 Claims, 3 Drawing Figures

SOLENOID NON RETURN VALVE

The invention relates to a solenoid valve, more particularly a solenoid valve for use in a hydraulic operating circuit for accessories in a motor vehicle, for example a circuit for operating a windscreen washer or headlamp washer.

There are many existing types of solenoid valve of various designs and constructions. Most of the known solenoid valves, however, fulfil an identical function: they control the opening and closing of a passage between an inlet orifice and an outlet orifice in response to operation of an electromagnetic device. For certain special uses, for example the control of a windscreen washer or headlamp washer in a motor vehicle, it is vital for the solenoid valve to have, in addition to a supply pump, a non-return device to prevent washing liquid flowing from the jets towards the pump. The non-return device is usually outside the solenoid valve, which in particular complicates the circuit and increases its cost, while reducing its reliability.

It is therefore desirable to have a solenoid valve which also acts as a non-return device when it is in the open position. It is also desirable for such a solenoid valve to be of very simple design, to avoid an excessive price increase and to limit the risk of failure inherent in a complex device.

To this end, the invention proposes a solenoid valve comprising a housing with at least one inlet orifice and with at least one outlet orifice which communicate by way of a passage containing valve forming means capable of moving inside the housing in response to operation of an electromagnetic device to effect opening or closing of the passage, the solenoid valve being characterized in that it also comprises piston forming means bearing a valve seat normally urged into fluid-tight engagement with the valve forming means by first resilient means, irrespective of the position occupied by the valve forming means, the latter being capable of occupying a first position in which they urge the piston forming means on to abutment means provided in the housing, counteracting the resilient means, so as to prevent any communication between the inlet and outlet orifices, and a second position in which the piston forming means are responsive to the difference in the pressures prevailing at the inlet and outlet orifices so as to permit communication from the inlet orifice towards the outlet orifice and prevent communication in the opposite direction.

According to another feature of the invention, the valve forming means are responsive to the pressure prevailing at the inlet orifice in order to occupy the first position in the absence of operation of the electromagnetic device.

According to a further feature of the invention, the electromagnetic device comprising a fixed core situated inside a coil, the second position of the valve forming means is defined by engaging of the fixed core by the valve forming means.

According to yet another feature of the invention, the solenoid valve comprises a second outlet orifice capable of communicating with the inlet orifice by way of a third passage, the piston forming means comprising second valve forming means capable of engaging in a fluid-tight manner a second valve seat formed in the housing when the first valve forming means are in their second position, so preventing communication between the inlet orifice and the second outlet orifice, such communication being permitted when the first valve forming means are in their first position.

A solenoid valve with these last features can be used, for example, for selectively operating a windscreen washing device and a device for washing the rear window of a motor vehicle.

A particular embodiment of the invention will now be described with reference to the accompanying drawings, in which.

Figure 1:
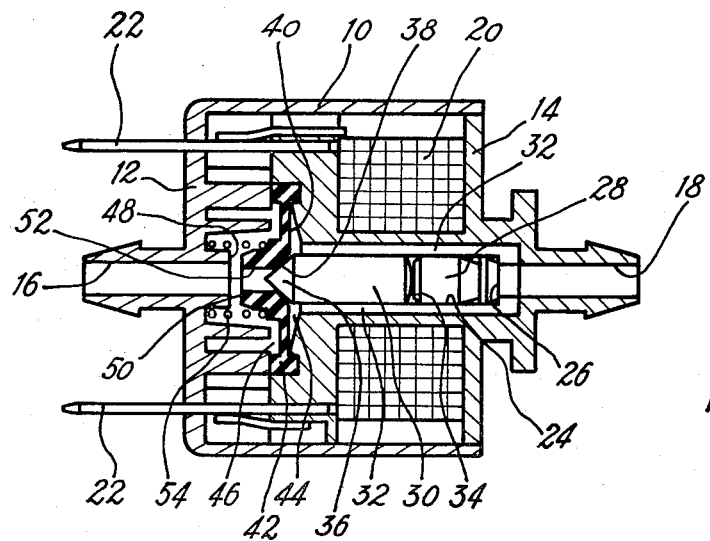
FIG. 1 represents a longitudinal section through a solenoid valve comprising a single outlet orifice and embodying the principles of the invention.

The solenoid valve illustrated in FIG. 1 comprises a housing 10, preferably moulded from synthetic plastic material, and comprising two portions 12, 14 assembled by an appropriate means, for example jointing, adhesive or welding. The portion 12 of the housing 10 forms a substantially cylindrical bell of which the base bears a central spigot containing an outlet orifice 16. The portion 14 forms, as it were, a plug closing the open end of the bell-shaped portion 12 of the housing 10, and it also bears a central spigot containing an inlet orifice 18. As a result of this arrangement, the inlet and outlet orifices 18, 16 are aligned on the axis defined by the housing 10 and open on to the opposite end faces of the housing.

The portion 14 of the housing 10 extends inside the portion 12 of the housing to receive a coil 20 connectable to an electrical supply circuit by means of terminals 22, which extend through and project from the portion 12 of the housing 10. If the housing 10 were not of electrically insulating material such as plastics, of course, insulating means of any type known to those skilled in the art would have to be provided between the coil 20 and terminals 22 and the housing 10. The coil 20 is wound in an annular configuration and surrounds a bore 24 formed in the portion 14 of the housing 10 between the inlet orifice 18 and that end of the portion 14 facing the outlet orifice 16. Preferably, the bore 24, coil 20, inlet and outlet orifices 18, 16 and housing 10 are coaxial. The bore 24 is larger in diameter than the inlet orifice 18 and therefore defines a shoulder 26, on which abuts a fixed core 28 force-fitted into the bore 24. The fixed core 28 is therefore offset axially towards the inlet orifice 18 relative to the coil 20.

Valve forming means comprising a movable armature 30 are also received, slidably, in the bore 24. Axial grooves 32 formed in the surface of the bore 24 define a passage between the inlet orifice 18 and the outlet orifice 16 of the housing 10, opening of the passage being controlled by movement of the movable armature 30 (see below). The movable armature 30 can engage the fixed core 28 by way of a convex face 34, so that the armature 30 is responsive to the pressure prevailing at the inlet orifice 18, even while it is in engagement with the fixed core 28. The opposite end 36 of the armature 30 is conical and acts as a valve in relation to a valve seat 38 formed on a wall 40. The wall 40 is of flexible material, for example elastomeric material, and its outer periphery bears a bead 42 received in a fluid-tight manner between the portions 12 and 14 of the housing 10. The wall 40 thus defines an inlet chamber 44, which communicates with the inlet orifice 18 by way of the grooves 32, and an outlet chamber 46, which communicates with the outlet orifice 16 by way of a space defined between the annular edge 48 of the housing 10 surrounding that end of the orifice 16 nearer the armature 30 and the annular edge 50 of the wall 40 facing the edge 48. A passage 52 in the wall 40 connects the inlet chamber 44 to the outlet orifice 16; those ends of the passage 52 facing the armature 30 and orifice 16 define the valve seat 38 and edge 50 respectively. The passage 52 is also axially aligned with the armature 30 and with the outlet orifice 16. Lastly, a helical spring 54 is provided in the outlet chamber 46, near the passage 52, to urge the valve seat 38 into engagement with the conical end 36 of the armature 30, irrespective of the position occupied by the latter.

The solenoid valve just described with reference to FIG. 1 operates as follows:

Let us assume that the inlet orifice 18 communicates with a supply circuit containing a pressure fluid source such as a hydraulic pump, that the outlet orifice 16 communicates with a hydraulic receiver, for example a windscreen washer jet, and that the terminals 22 are connected to an electrical operating circuit. When no pressure is transmitted to the inlet orifice 18 and when the coil 20 is not energized, the various components of the solenoid valve occupy the positions shown in FIG. 1.

When the circuit is pressurized, for example due to operation of the hydraulic pump, the pressure at the inlet orifice 18 acts both on the convex face 34 of the armature 30 and on that side of the wall 40 facing the inlet chamber 44, so urging the armature 30 and wall 40 to the left in FIG. 1 and counteracting the force exerted by the spring 54. As a result, the surface 50 on the wall 40 abuts on the surface 48 on the housing, which has the dual result of sealing off the outlet chamber 46 from the outlet orifice 16 and of preventing any other movement towards the left of the inner portion of the wall 40 and of the armature 30. The latter therefore occupies a first position which may be termed its closing position, in which its conical end 36 engages in a fluid-tight manner the valve seat 38 defined on the wall 40 under the influence of the pressure acting on its convex end 34, so that there is no connection between the inlet orifice 18 and outlet orifice 16.

When the electrical circuit connected to the terminals 22 is closed, the coil 20 is energized, so that the armature 30 is urged to the right in FIG. 1. In a preferred embodiment of the invention, however, the coil 20 comprises a limited number of turns calculated so that the force exerted by the coil 20 on the armature 30 when the latter is in its closing position, plus the force exerted by the spring 54, is too small to counterbalance the force resulting from pressurization of the supply circuit communicating with the inlet orifice 18 of the solenoid valve. Thus energization of the coil 20 has no effect on the solenoid valve, which remains closed until the pressure applied to the inlet orifice falls again enough to permit the spring 54 to return the wall 40 and movable armature 30 into the idle positions shown in the Figures. In practice this result is obtained when the hydraulic pump communicating with the inlet orifice 18 ceases operating.

Assuming now that the electrical circuit connected to the terminals 22 is closed prior to, or simultaneously with, operation of the hydraulic pump communicating with the inlet orifice 18, the solenoid valve operates as follows:

At the time the coil 20 is energized, the wall 40 and movable armature 30 are occupying the positions shown in FIG. 1 under the influence of the spring 54. The force exerted by the coil 20 on the armature 30, to which the force exerted by the spring 54 is added, is then sufficient to counterbalance the force resulting from pressurization of the supply circuit connected to the inlet orifice 18 of the solenoid valve, so that the armature 30 remains in the position shown in FIG. 1. The surface 50 on the wall 40 is now clear of the surface 48 on the housing, so that the valve seat 38 defined on the wall 40 can move away from the conical end 36 of the armature 30 under the influence of the pressure admitted to the inlet chamber 44 along the grooves 32 in the surface of the bore 24. The inlet orifice 18 can therefore communicate with the outlet orifice 16 by way of the grooves 32, inlet chamber 44, valve 36, 38 and passage 52.

When the hydraulic pump communicating with the inlet orifice 18 ceases to operate, the pressure prevailing at this orifice 18 falls below the pressure prevailing at the outlet orifice 16. In accordance with the invention, the hydraulic fluid connection from the outlet orifice 16 to the inlet orifice 18 which then tends to establish itself is prevented by the wall 40, which responds to the pressure difference between the inlet and outlet chambers 44,46 communicating respectively with the inlet and outlet orifices, so as to move the valve seat 38 defined on the wall 40 on to the conical end 36 of the armature 30 when the pressure prevailing in the outlet chamber 46 plus the pressure exerted by the spring 54 come to exceed the pressure in the inlet chamber 44. The pressure at the outlet orifice 16 is thus maintained at a high enough level to permit a very rapid response from the solenoid valve when the hydraulic pump communicating with the inlet orifice 18 is operated again.

It should be noted that operation as just described is that of a solenoid valve with a highly simplified coil 20 in which the return force exerted on the movable armature 30 is enough to hold the latter in the position shown in FIG. 1, counteracting the force resulting from pressurization of the supply circuit, but is not enough to return the armature 30 to this position when it has previously been urged to the left by pressurization of the supply circuit. This result is obtained by adding the spring 54, which urges the movable armature 30 into its idle position by way of the wall 40. It greatly simplifies the electrical portion of the solenoid valve, and above all it substantially reduces its cost. Obviously, however, a solenoid valve of this kind could equally well be equipped with a larger coil without thereby exceeding the scope of the invention. The essential difference between its operation and that just described would be that energization of the coil following pressurization of the supply circuit would return the movable armature 30 and wall 40 to the positions shown in the Figure, so allowing hydraulic fluid to flow from the inlet orifice 18 to the outlet orifice 16 while preventing any flow in the opposite direction.

The solenoid valve which will now be described with reference to FIG. 2 differs from that illustrated in FIG. 1 essentially in that it has two outlet orifices. To facilitate comprehension of the invention, elements of the solenoid valve shown in FIG. 2 fulfilling identical functions to elements of the valve shown in FIG. 1 bear the same reference numerals plus 100.

Figure 2:
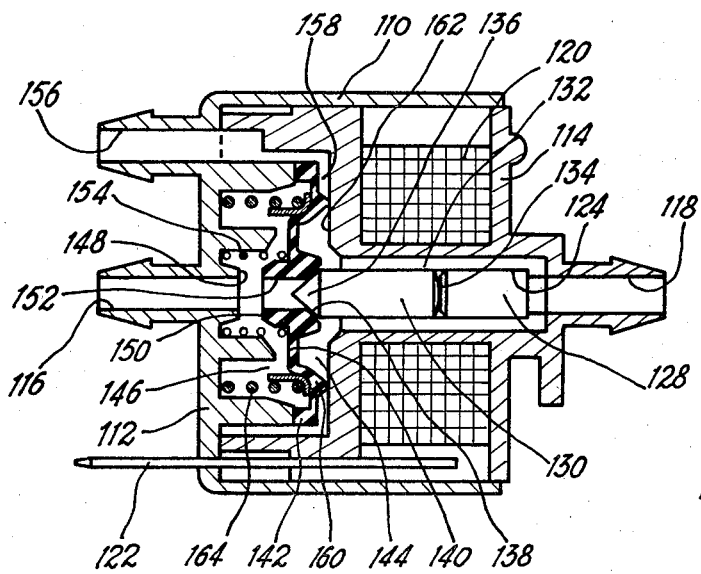
FIG. 2 is a longitudinal section through a solenoid valve comprising two outlet orifices and embodying the principles of the invention.

As in FIG. 1, the solenoid valve illustrated in FIG. 2 has a housing 110 in two portions 112, 114 of substantially cylindrical shape. The centres of the opposite end faces of the housing 110 bear spigots containing an inlet orifice 118 and, opposite it, an outlet orifice 116. The housing portion 114 also bears an annular coil 120 connectable to an electrical operating circuit by two terminals 122, only one of which is shown. The housing portion 114 also contains a bore 124 extending between the inlet orifice 118 and the outlet orifice 116 and receiving a force-fitted, fixed core 128 and a freely movable member 130. As in the previous embodiment, that end 134 of the armature 130 opposite the fixed core 128 is convex, whereas its opposite end 136 is conical and can engage in a fluid-tight manner a valve seat 138 defined at the end of a passage 152 formed in a wall 140 of flexible material. The outer peripheral edge of the wall 140 bears a bead 142 immobilized in a fluid-tight manner between the housing portions 112, 114, so as to define on opposite sides of the wall 140 an inlet chamber 144, which communicates with the inlet orifice 118 by way of grooves 132 in the surface of the bore 124, and an outlet chamber 146, which communicates with the outlet orifice 116 by way of an annular space defined between the edges 146, 150 of the mutually opposite ends of the outlet orifice 116 and of the passage 152 formed in the housing 110 and wall 140 respectively.

As in the previous embodiment, a spring 154 is provided between the housing portion 112 and the wall 140 near the passage 152, so that it simultaneously urges the valve seat 138 into fluid-tight engagement with the end 136 of the armature 130 and urges the surface 150 off the surface 148.

The embodiment illustrated in FIG. 2 differs essentially from the embodiment shown in FIG. 1 in that the housing 110 has, on the same side as the outlet orifice 116, a spigot containing a second outlet orifice 156 which gives on to a second, annular outlet chamber 158 separated from the inlet chamber 144 by an annular bead 160. The bead 160 is formed on the wall 140 between its peripheral bead 142 and the valve seat 138 and defines a valve member capable of engaging a valve seat defined on the housing 110 and consisting of a plane surface 162. A spring 164 situated in the outlet chamber 146 urges the bead 160 into fluid-tight engagement with the surface 162, so that it normally disconnects the inlet chamber 144 from the second outlet chamber 158. Note that the flexibility of the wall 140 enables the bead 160 and valve seat 138 to move axially relative to one another and relative to the peripheral bead 152. Moreover, the spring 164 is radially offset relative to the spring 154, so that the spring 164 acts on the wall 140 approximately at the level of the bead 160, whereas the spring 154 acts on the wall 140 approximately at the level of the valve seat 138. Also, the force exerted by the spring 164 is substantially greater than that exerted by the spring 154.

The solenoid valve just described with reference to FIG. 2 operates as follows:

Let us assume that the inlet orifice communicates with a supply circuit comprising a pressure fluid source, for example a hydraulic pump, and that the outlet orifices 116, 156 communicate with respective receiver devices, for example devices for washing the windscreen and rear window of a motor vehicle. We shall also assume that an electrical operating circuit is connected to the terminals 122 of the coil 120.

FIG. 2 shows the solenoid valve in the position which is occupied when the supply circuit for the coil 120 is open and when the hydraulic circuit to which it is connected is not under pressure.

When the hydraulic circuit is pressurized and the pressure therefore rises at the inlet orifice 118, the pressure acting on the convex face 134 of the armature 130 and on that side of the wall 140 facing the inlet chamber 144 urges the armature 130 and the inside portion of the wall 140 towards the left in FIG. 2. During this movement, and as in the previous embodiment, the surface 150 of the wall 140 comes into fluid-tight engagement with the surface 148 on the housing 110, so disconnecting the outlet orifice 116 from the outlet chamber 146. In parallel, the end 136 of the armature 130 engages the valve seat 138 in a fluid-tight manner under the influence of the pressure acting on the convex face 134, so that the inlet orifice 118 and outlet orifice 116 are still disconnected. The structure of the wall 140 is such that, when the surface 150 engages the surface 148, the bead 160 is clear of the surface 162 of the housing despite the force exerted by the spring 164. Consequently, the inlet orifice 118 and the second outlet orifice 156 can communicate as long as the pressure at the inlet orifice 118 remains high enough to maintain the wall 140 in this position.

When the circuit connected to terminals 122 is closed, the coil 120 is energized, so that the armature 130 is urged to the right in FIG. 2. However, as in the previous embodiment, the number of turns making up the coil 120 is preferably such that the force exerted by the coil on the armature 130 is too small to return the armature 130 into the position shown in FIG. 2. The inlet and outlet orifices 118, 116 are therefore still disconnected.

When pressurization of the supply circuit occurs after or at the same time as energization of the coil 120, the force exerted by the coil 120 is sufficient, however, to hold the armature 130 in the position shown in FIG. 2. Communication between the inlet orifice 118 and outlet orifice 116 is now possible, whereas communication in the opposite direction is prevented by the wall 140 as in the embodiment described with reference to FIG. 1. In parallel, the annular bead 160 is kept in fluid-tight contact with the plane surface 162 by the spring 164 and by the fluid pressure prevailing in the outlet chamber 146 due to opening of the valve 136, 138, so that communication between the inlet orifice 118 and outlet orifice 156 becomes impossible.

The pressure fluid admitted to the inlet orifice 118 is thus communicated selectively to the outlet orifice 156 or the outlet orifice 116, depending on whether the coil 120 is energized after or before pressurization of the inlet orifice 118. As in the embodiment described with reference to FIG. 1, the wall 140 acts as a non-return valve between the inlet and outlet orifices 118, 116.

Figure 3:
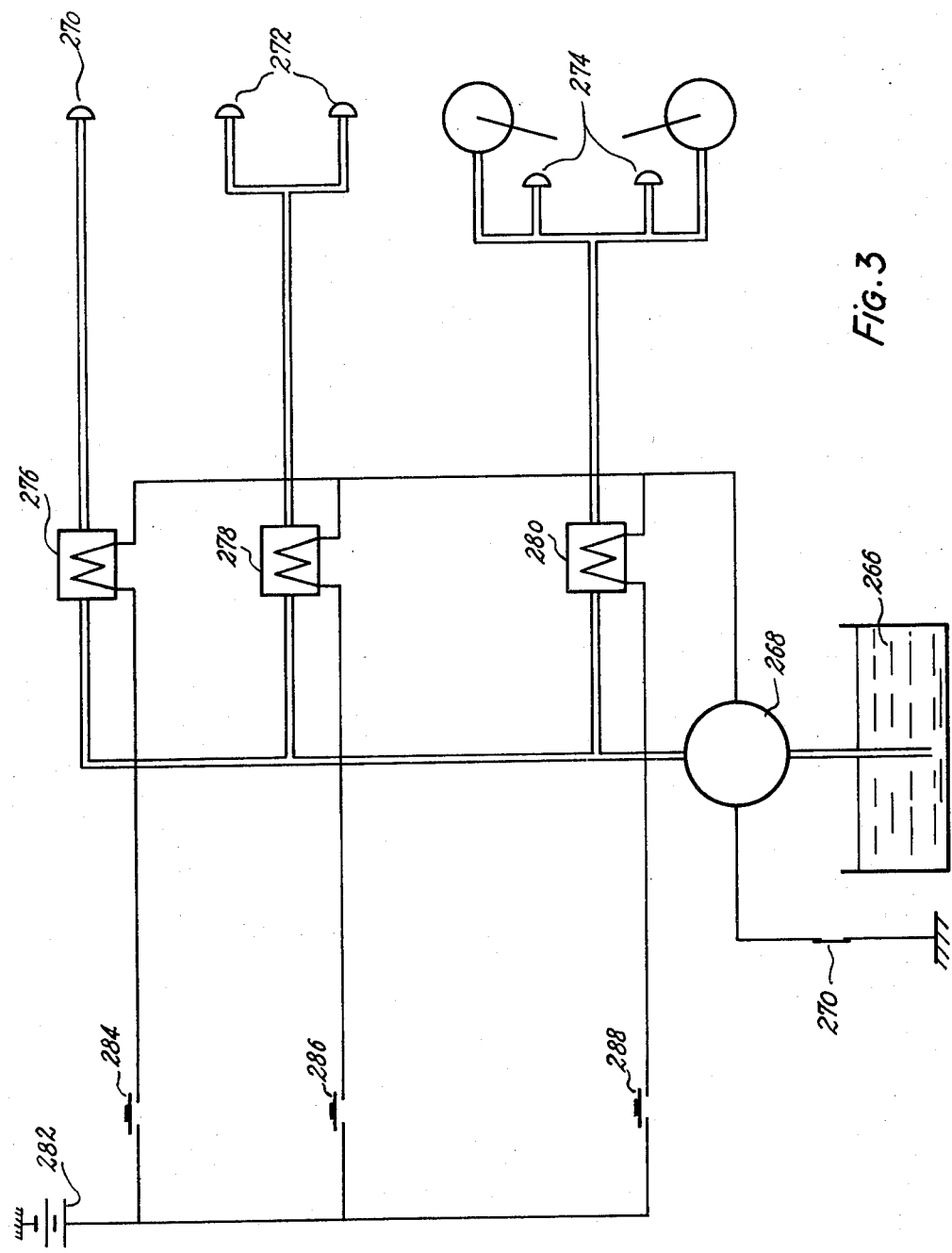
FIG. 3 illustrates diagrammatically a circuit for washing the windscreen, rear window and headlamps of a motor vehicle, using three solenoid valves of the same kind as the solenoid valve shown in section in FIG. 1.

FIG. 3 illustrates diagrammatically, by way of example, a particular application of the invention to an operating circuit for headlamp washers, windscreen washers and rear-window washers in a motor vehicle.

This circuit consists primarily of a hydraulic portion comprising a reservoir 266, a pump 268 and the respective jets 270, 272 and 274 of a device for washing the rear window, windscreen and headlamps of a motor vehicle. The pump 268 communicates with the jets 270, 272, 274 independently by way of three solenoid valves 276, 278 and 280, which may all be identical and may conform to the embodiment described with reference to FIG. 1.

The device described with reference to FIG. 3 also comprises an electrical supply circuit for the pump 268 and the coils of the solenoid valves 276, 278 and 280, consisting essentially of a voltage source 282 which supplies the coils of the three solenoid valves in parallel by way of separate switches 284, 286 and 288, the electric motor for the pump 268 being in turn mounted in series with the solenoid valves, and also a master switch 290.

The device just described with reference to FIG. 3 also comprises an electrical supply circuit for the pump 268 and the coils of the solenoid valves 276, 278 and 280, consisting essentially of a voltage source 282 which supplies the coils of the three solenoid valves in parallel by way of separate switches 284, 286 and 288, the electric motor for the pump 268 being in turn mounted in series with the solenoid valves, and also a master switch 290.

The device just described with reference to FIG. 3 operates as follows:

When the switch 290 is closed as shown in FIG. 3, closure of any of the switches 284, 286 and 288 simultaneously energizes the coil of the corresponding solenoid valve and the electric motor for the pump 268. Consequently hydraulic pressure fluid is fed to the inlet orifice 18 of the solenoid valve, and the armature 30 of the valve is held in the position shown in FIG. 1. A connection from the inlet orifice 18 to the outlet orifice 16 is therefore permitted, so that each of the corresponding jets is supplied with hydraulic fluid. When the switch 284, 286 or 288 is open again, the pump 268 stops and the coil 20 is de-energized, which both reduces the pressure at the inlet orifice 18 and allows the armature 30 to move. The wall 40, acting as a non-return valve, now engages the end 36 of the armature 30 in a fluid-tight manner, so that a certain pressure can be maintained in the line connecting the outlet orifice 16 to each of the associated jets. It will be appreciated that this feature allows a considerable reduction in the response time relative to a device of the same type using conventional solenoid valves.

The invention is not restricted to the embodiment just described by way of example. In particular, the flexible wall 40 might be replaced by a slidable piston or any other equivalent device. Similarly, the convex face 34 of the movable armature 30 may be differently shaped, provided that the two mutually opposite faces of the fixed core 28 and movable armature 30 cooperate in such a way that the latter can move to the left in FIG. 1 in response to an increase in pressure at the inlet orifice 18. Lastly, the particular arrangement of the inlet and outlet orifices described with reference to FIGS. 1 and 2 is given by way of example only and constitutes only one particular embodiment of the invention.

What we claim is:

1. A solenoid valve comprising a housing having at least one inlet port and at least one outlet port which communicate by way of a first passage containing a poppet member movable in response to operation of an electromagnetic device to open or close said passage, pressure differential responsive piston means defining in said passage an inlet chamber communicating with the inlet port and an outlet chamber communicating with the outlet port, said inlet and outlet chambers communicating via a second passage defined in said piston means, a valve seat defined in the second passage of said piston means being normally urged into fluid-tight engagement with the poppet member by resilient means, the poppet member being adapted to move between a first position by fluid pressure in the inlet which urges the piston means on to abutment means provided in the housing against the action of the resilient means, so as to prevent any communication between the inlet and outlet ports, said electromagnetic device retains the poppet member in a fixed second position, said piston means being adjacent said abutment means and is responsive to the pressure differential prevailing between said inlet and outlet ports so as to permit communication from the inlet port towards the outlet port when the pressure level at the inlet port is greater than the pressure level at the outlet port by an amount sufficient to overcome the force exerted by said resilient means and to prevent communication in the opposite direction.

2. A solenoid valve as claimed in claim 1, characterized in that the poppet member is responsive to the pressure prevailing in the inlet chamber to occupy the first position when the electromagnetic device is not operated.

3. A solenoid valve as claimed in claim 1 or 2, wherein the electromagnetic device comprises a fixed core situated inside a coil, the second position of the poppet member being defined by engaging of the fixed core by said poppet member.

4. A solenoid valve as claimed in claim 3, wherein said poppet member comprises a substantially cylindrical armature, axially movable between said first and second positions inside a bore provided in said housing, the fixed core being also substantially cylindrical and mounted in said bore between the inlet port and the movable armature, at least one groove being formed in the wall of the bore to communicate the inlet port with the inlet chamber.

5. A solenoid valve as claimed in claim 4, wherein the diameters of said armature and of said core are substantially equal, one at least of their facing ends being convex to define on said armature a fluid pressure responsive surface area responsive to fluid pressure in said inlet chamber.

6. A solenoid valve as claimed in claim 3, wherein energization of the coil generates a first or a second electromagnetic force, according to whether the poppet member is in the first or the second position, the first electromagnetic force being smaller than the force resulting from the pressure in the inlet chamber acting on the poppet member, whereas the second electromagnetic force is greater than the force resulting from the pressure in the inlet chamber acting on the poppet member.

7. A solenoid valve as claimed in either claim 1 or 2, wherein the outlet port is substantially aligned with the second passage, the facing edges of said housing and of said piston means surrounding the outlet port and the second passage respectively defining a space of variable width controlling communication between the outlet port and the outlet chamber, said space being closed to seal off the outlet chamber from the outlet port when the poppet member is in the first position.

8. A solenoid valve as claimed in either claim 1 or 2, wherein a second outlet port is capable of communicating with the inlet port by way of a third passage, the piston means comprising a second poppet member capable of engaging in a fluid-tight manner a second valve seat formed in the housing when the first poppet member is in the second position, so preventing communication between the inlet port and the second outlet port, such communication being permitted when the first poppet member is in the first position.

9. A solenoid valve as claimed in claim 8, wherein the second poppet member comprise an annular portion formed on the piston means and capable of engaging in a fluid-tight manner a corresponding portion formed in the housing so as to define the outer peripheral edge of the inlet chamber and the inner peripheral edge of, a second, annular outlet chamber surrounding the piston means and communicating with the second outlet port.

10. A solenoid valve as claimed in either claim 1 or 2, wherein the piston means comprise a wall of flexible material of which the outer peripheral edge is associated with the housing in a fluid-tight manner.

11. A solenoid valve as claimed in claim 9 wherein the piston means comprise a wall of flexible material of which the outer peripheral edge is associated with the housing in a fluid-tight manner, said annular portion of the wall comprising a bead urged on to the corresponding portion of the housing by second resilient means.

12. A solenoid valve as claimed in claim 11, wherein the force exerted by the second resilient means is greater than the force exerted by the first resilient means, and the said resilient means act on radially offset portions of the wall, so that the wall portion surrounding the second passage is axially movable contrary to the first resilient means without moving the bead contrary to the second resilient means, when the first poppet member is in the second position.

13. A solenoid valve comprising:
a housing having a compartment therein and an inlet port and an outlet port both communicating with said compartment;
a wall dividing said compartment into an inlet chamber communicating with said inlet port and an outlet chamber communicating with said outlet port, said wall being responsive to the fluid pressure prevailing in said chambers to move between a first position engaging a first abutment adjacent said outlet port and a second position in which said wall is spaced from said abutment, said wall defining a passage therethrough which communicates one chamber with the other, said passage defining a valve seat adjacent said inlet chamber;
a magnetically responsive valve member slidable in said inlet port and having a first pressure responsive face engageable with said valve seat to close said passage and a second pressure responsive face opposite said first face, said valve member being shiftable between a first location in which said first face engages said valve seat while said wall is in its first position and said valve member sliding to a second location in engagement with a second abutment means carried by said housing; said valve member, when in its second location, cooperating with said wall to define the second position of said wall by engagement of said valve seat with said first face; whereby said wall and said valve member are together pressure responsive to engage each other at said valve seat and said first face, fluid pressure prevailing in said inlet chamber acting upon said valve member at its second face to urge said member into sealing engagement with said valve seat and urging said member and said wall together toward said first abutment whereby fluid flow toward said outlet port is prevented;
resilient means for yieldably biasing said wall to its second position, said wall thereby urging said valve member to its second location by engagement of said valve seat with said first face whereby fluid flow from said outlet toward said inlet is prevented;
electromagnetic means for maintaining said valve member in its second location upon operation of said electromagnetic means whereby fluid pressure prevailing in said inlet chamber which exceeds the fluid pressure prevailing in said outlet chamber by an amount sufficient to overcome said resilient bias moves said wall toward its first position and disengages said valve seat from said valve member first face to allow flow toward said outlet port, said wall being responsive to fluid pressure prevailing in said chambers to engage said valve seat with said first face and prevent flow in the opposite direction.

14. The valve of claim 13 wherein said wall is defined by a resilient diaphragm having peripheral engagement with said housing.

15. The valve of claim 13 wherein said valve member is a generally cylindrical element having a conical first pressure responsive face at its one end and a second pressure responsive face at its opposite end, said element including as at least a portion thereof a mass of magnetically responsive material.

16. The valve of claim 13 wherein said second abutment means cooperating with said valve member includes a magnetically responsive core fixed in said inlet port.

17. The valve of claim 13 wherein said electromagnetic means includes an electrical conductor coiled around the portion of said housing which defines said inlet port.

18. A solenoid valve comprising a housing having an inlet port and an outlet port, a passage communicating the inlet port with the outlet port, presure differential responsive valve means dividing said passage into an inlet chamber and an outlet chamber, a valve seat cooperating with said pressure differential responsive valve means, an aperture in said pressure differential responsive valve means for permitting communication between said inlet and outlet chambers, plunger means slidably mounted in said passage and including structure cooperating with said aperture to control fluid communication through said aperture, an electrically responsive solenoid for forcing said plunger means from a first position in which said plunger means is responsive to fluid pressure at said inlet port to hold said differential responsive valve means in sealing engagement with said valve seat while said structure closes said aperture, regardless of the relative pressure levels in the inlet and outlet chambers, said structure is held in a second position in response to actuation of the solenoid allowing said pressure differential responsive valve means to move away from said valve seat, said inlet port being communicated to the inlet chamber regardless of the position of said plunger means so that said pressure differential responsive means is exposed to the pressure levels at said inlet and outlet ports regardless of the position of said plunger, and resilient means yieldably urging said differential responsive valve means into a condition in which said structure sealingly engages said aperture when said plunger means is in said second position, said pressure differential responsive means being responsive to the pressure differential between the inlet and outlet chambers to move said aperture away from sealing engagement with said structure when the pressure level at the inlet port is sufficiently greater than the pressure differential at the outlet port to overcome said resilient means but said resilient means otherwise urging said pressure differential responsive means into a position closing said aperture.

* * * * *